June 29, 1943.  R. B. McKINNIS  2,323,147
CONVEYER
Original Filed Oct. 7, 1939    4 Sheets-Sheet 1

FIG. I.

Inventor
RONALD B. McKINNIS
By Semmes, Keegin & Semmes
Attorneys

June 29, 1943.    R. B. McKINNIS    2,323,147
CONVEYER
Original Filed Oct. 7, 1939    4 Sheets-Sheet 3

Inventor
RONALD B. McKINNIS

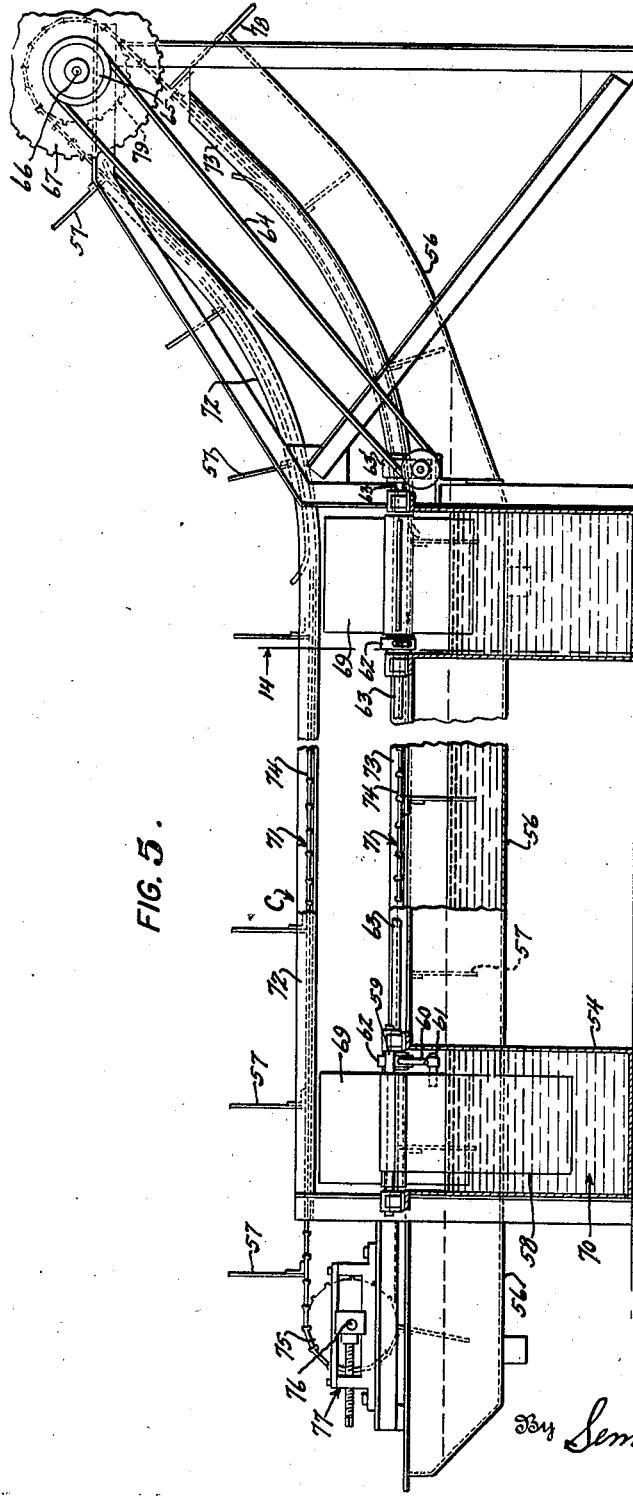

Patented June 29, 1943

2,323,147

UNITED STATES PATENT OFFICE 2,323,147

CONVEYER

Ronald B. McKinnis, Winter Haven, Fla., assignor, by mesne assignments, to Ronald B. McKinnis, doing business as McKinnis Foods, Winter Haven, Fla.

Original application October 7, 1939, Serial No. 298,464. Divided and this application June 5, 1940, Serial No. 338,988

7 Claims. (Cl. 214—17)

My invention relates to a method and apparatus for extracting fruit and vegetable juices. It is particularly applicable to the extraction of juice from citrus fruits, but has application to other fruits, as well as vegetables.

This application is a division of my co-pending application Serial No. 298,464, filed October 7, 1939.

Another object of the invention is to provide an apparatus which is simple to construct, easy to repair and replace, and which prevents access of oxygen to the extracted juices at any point in the process.

Still another object of the invention is to provide an output conveyer which is simple in construction, positive in operation, and which will prevent access of oxygen to the juice in the extracting chamber.

With these and other objects in view, which may be incident to my improvements, the invention consists in the parts and combinations to be hereinafter set forth and claimed with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Fig. 5 is a detail sectional view showing the peel discharge conveyer, some of the parts being broken away to more clearly indicate the construction;

Fig. 6 is a view taken along the line 6—6 of Fig. 5, looking in the direction of the arrows.

Figure 1:
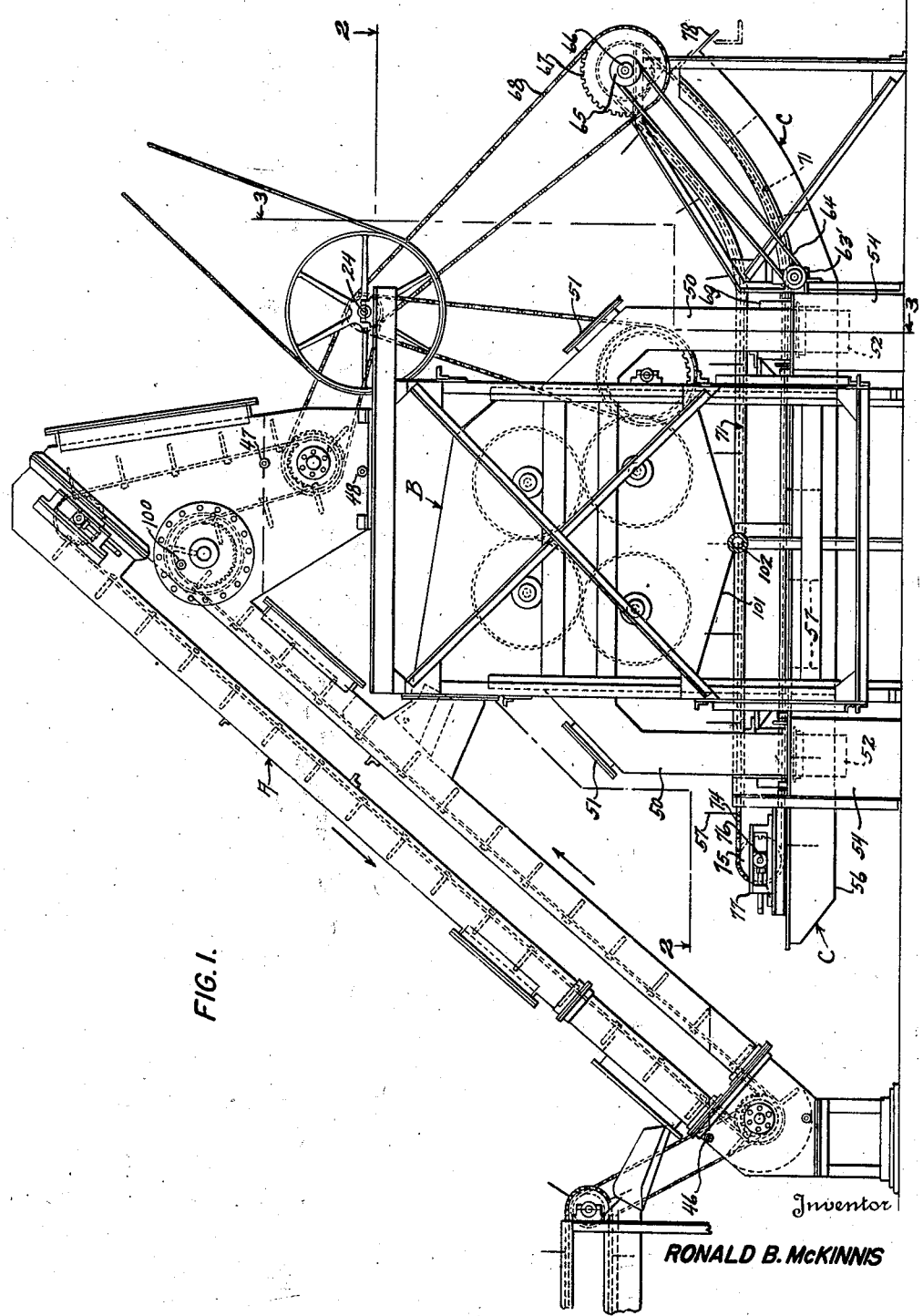
Figure 1 represents my apparatus in side elevation, some of the parts being shown in dotted lines to more clearly indicate the construction.
Figure 2:
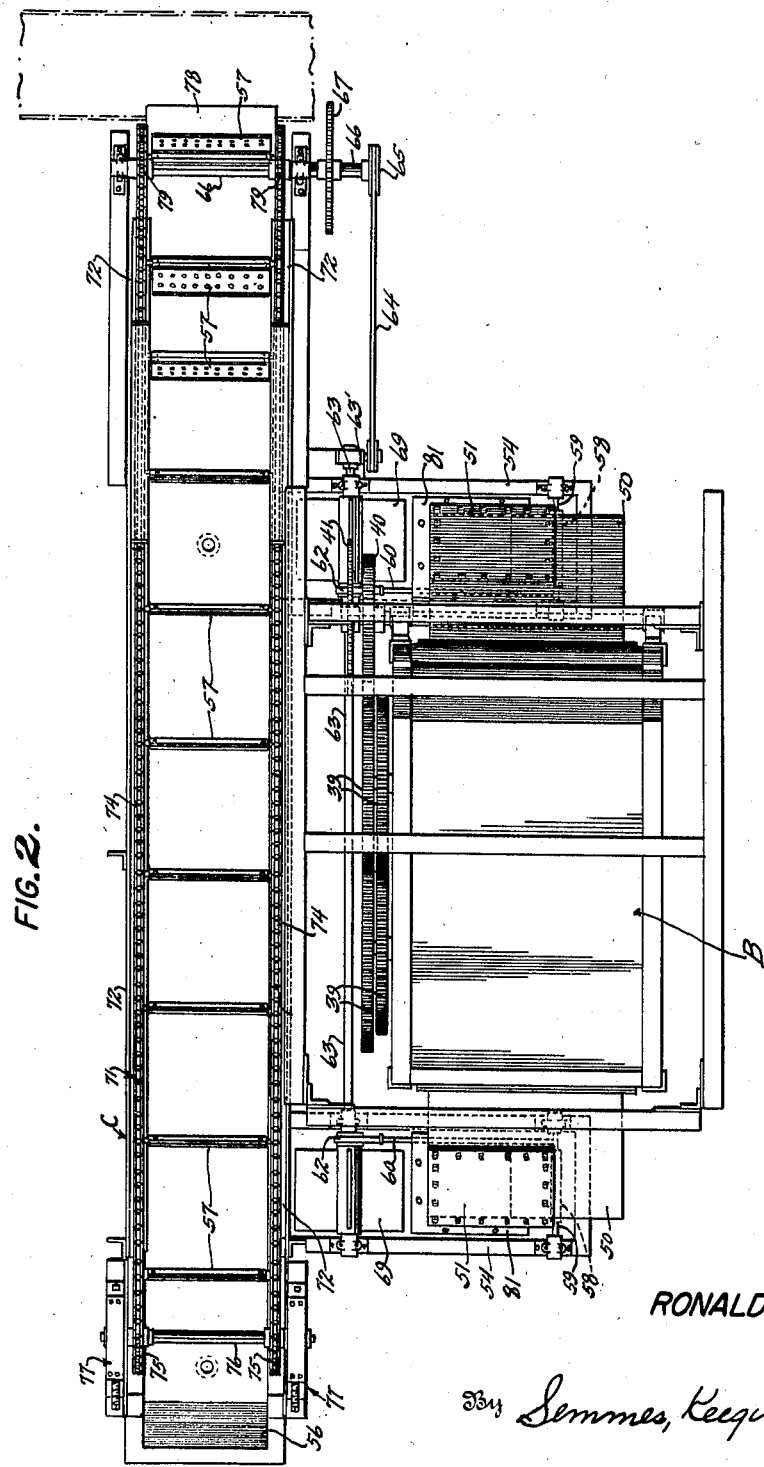
Fig. 2 is a view taken along the line 2—2 of Fig. 1, looking in the direction of the arrows.
Figures 3, 4:
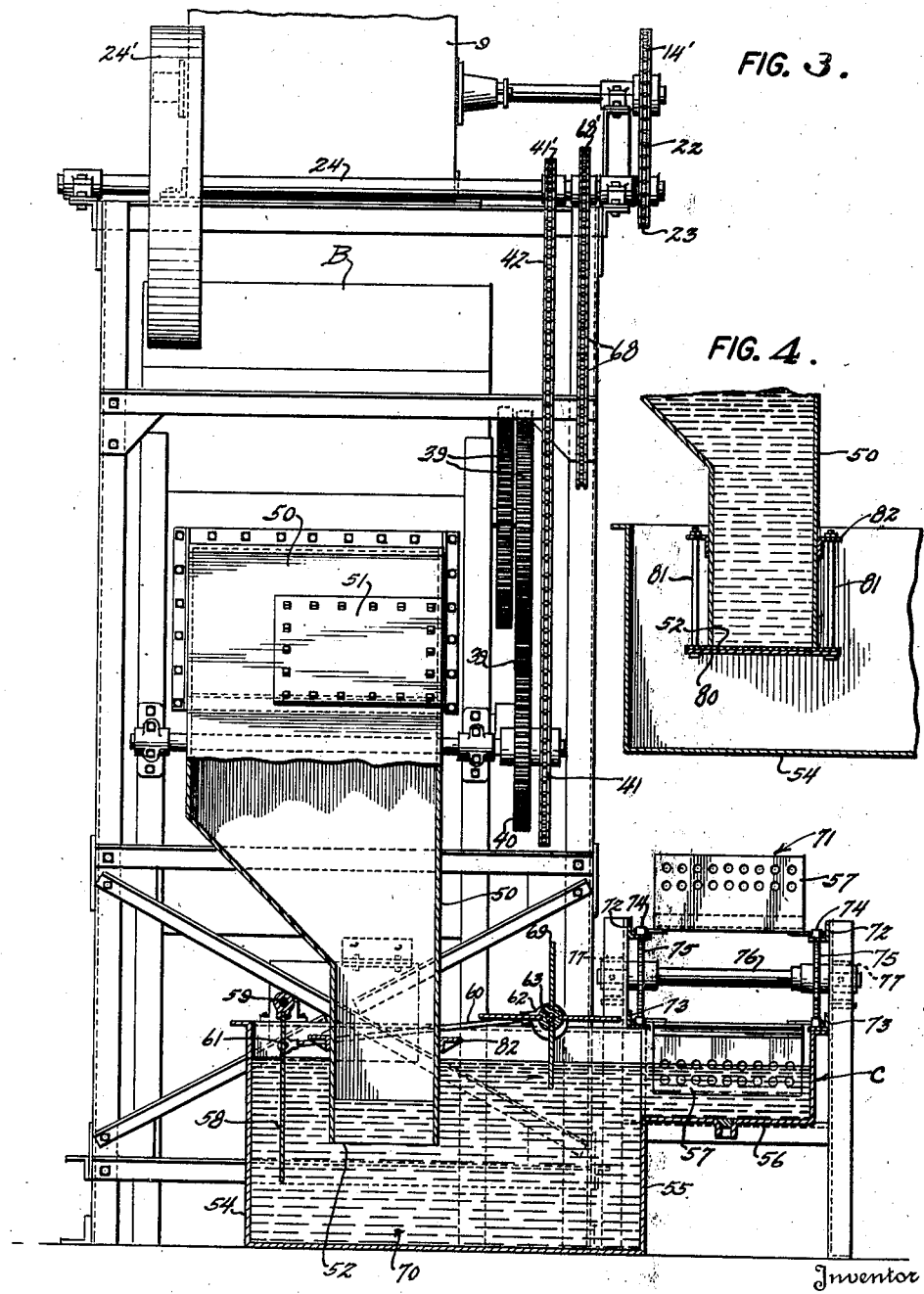
Fig. 3 is a view taken along the line 3—3 of Fig. 1, looking in the direction of the arrows.
Fig. 4 is a detail sectional view showing the peel discharge chute with the removable closure in place.

Referring to the drawings, I have shown an apparatus comprising an input elevating conveyer A, an extracting mechanism B, and a peel discharge mechanism C.

Leading outwardly and downwardly from the extracting section B of my device are peel discharge chutes 50, in the sides of which are clean out hatches 51. Each chute 50 has a delivery end 52 which is adapted to lie below the water level 53 in vats 54 (see Fig. 6). Each vat 54 is connected at its side 55 with a trough construction 56 in which are adapted to travel flights 57 of the output conveyer mechanism C.

By having the delivery chutes deliver the peels from the extracting chamber B below water or liquid level, access of oxygen to the extracting mechanism and the extracted juices is prevented. The whole mechanism is adapted to be filled with inert gas, such as carbon dioxide or nitrogen, to prevent oxidation of the extracted juices at any time either during extraction or after extraction. The purpose of the construction is to prevent access of oxygen at any time to the juices from the disruption of the fruit until the juices are delivered and sealed in the containers.

In order to prevent clogging of the output end of the peel chutes 50, I have provided agitating means in the vats 54 to disturb the liquid adjacent the discharge end of the chutes 50. The form of mechanism I have shown for accomplishing this agitation is indicated in Fig. 6 where I have shown an oscillating paddle member 58 mounted on a shaft 59 supported by the top of the vat 54. An operating arm 60 is pivoted at 61 to the paddle 58, and is driven through a reduction gear 63' by an eccentric cam construction, indicated generally by the numeral 62, which is mounted on a shaft 63 that is driven by a belt 64 from a pulley 65 which is mounted on a drive shaft 66. The drive shaft 66 derives its power through a sprocket 67 that is driven by a sprocket chain 68 which passes over a sprocket 68' on the counter-shaft 24.

The shaft 63 likewise drives a paddle 69 in the direction indicated by the arrow which moves the peels which are now floating on the water in this discharge liquid seal, indicated generally by the numeral 70, in towards the trough 56 so that the peels can be engaged by the conveyer flights 57 and discharged, as will later be indicated. The oscillation of the paddle 58 prevents clogging of the lower end of the peel discharge chute 52.

The conveyer flights 57 are moved by the flexible endless conveyer 71, which passes along upper guides 72 and lower guides 73.

The flexible conveyer 71 comprises two sprocket chain members 74 which pass over sprockets 75 mounted on a shaft 76 which is adjustable longitudinally by means of a screw-threaded adjusting mechanism 77, indicated generally. This mechanism enables the flexible conveyer 71 to be tightened. One end of the guides 72 and 73 are up-turned, as indicated in Fig. 13. The peels drop out along the discharge surface 78 of a discharge chute. The conveyer 71 is driven by means of sprocket drives 79, which are in turn driven by the sprocket 67 mounted on the shaft 66. The sprocket 67 is driven by the sprocket chain 68, as previously described.

Each of the discharge chutes 50 is adapted to have its lower end 52 enclosed by removable closure members 80 which are held in place by means of bolts 81 which pass through the closure members 80 and through flanges 82 formed on the lower end of the peel discharge chutes 50. This arrangement is such that water can be retained in the system prior to beginning the extracting operation, as will be later described. The removable closures 80 are adapted to be removed when the extracting operation proper has been commenced.

I have provided a gas inlet 100 controlled by a suitable valve (not shown) for introducing an inert gas into the interior of the input conveyer, the extracting mechanism B and the peel discharge chute. The extracting mechanism B is provided with a bottom which slopes towards the center, as indicated at 101, into which the juice is discharged through a collection pipe 102, from whence the juice may be taken to the filling operation for filling containers with the extracted juice.

In order to remove all of the oxygen in the apparatus at the start of the operation, I fill the interior of the apparatus with water. I close all of the assembly hatches and the discharge ends of the chutes 50. Water is then allowed to flow into the apparatus and fill it. That is to say, the downwardly projecting section of the input conveyer is filled with water; the extracting section B is filled, and the peel output ducts 50 are filled. Likewise the vats 54 and the trough 56 are filled with water. Now the whole machine is filled with water and gas can be introduced through the gas line 100. This gas may be carbon dioxide, or nitrogen, or a mixture of both, or other suitable inert gas which will prevent oxidation of the extracted juice. Water is let out of the machine as the gas fills the machine. The vats 54 and trough 56 are kept filled with water. Now the entire interior of the machine is filled with a non-oxidizing or inert gas. The closure plates 80 for the bottom of each of the discharge chutes 50 are then removed.

Oranges, or other citrous fruit, are fed into the input hopper of the elevating conveyer A that feeds the slicing and juice extracting mechanism. The fruit passes to the cutting and extracting mechanism in section B of the machine. Each of the fruit is halved by cutting knives (not shown), and the juice is extracted by mechanism (not shown), the juice flowing to the sloping floor 101 of the extracting section B of the machine, from whence it can be allowed to flow out to fill receptacles.

The peels fall out of the extracting section B of the machine through discharge chutes 50, and are discharged through the ends 52 of the discharge chutes 50 under the surface of the water in the vats 54. The paddles 58 adjacent the discharge ends 52 of the discharge chutes 50 keep the peels from clogging by keeping the water in motion. The paddles 69 move the floating fruit peels from each of the vats 54 over into the trough 56. The flights 57 of the discharge conveyer C engage the fruit peels and discharge them over the sloping discharge chute surface 78 to a vat or another conveying trough, as desired.

It is to be noted that no oxygen can contact the fruit or the juice in its passage through the machine from the time the fruit enters the elevating conveyer A until the extracting operation is completed. Access of oxygen is prevented through operation of the liquid seals 44 and 37 at the top and bottom of the elevating conveyer A, and likewise the liquid seals formed at the bottom of the peel discharge chutes 50 prevent access of oxygen into the extracting chamber B.

Further it will be observed that the peel discharge mechanism is efficient and easy of access for hand cleaning if necessary, and the peels are given constant motion as they go from the extracting section through the water seal and into the discharge conveyer, thus preventing their clogging.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A discharge mechanism for floatable waste solid products from a process carried on out of communication with the atmosphere, comprising a chute having a lower end down which the solid products are adapted to pass, a liquid pool into which the lower end of the chute passes, a blade to agitate the liquid adjacent to the lower end of the chute to prevent clogging, means to give the floatable solid products movement in a given direction through the liquid, and a conveyer member in the path of the direction of movement of the floatable solid waste product to discharge these products.

2. A discharge mechanism for floatable waste solid products comprising a chute, a pool of liquid into which the chute discharges, blade means extending below the chute to agitate the liquid adjacent to the discharge end of the chute to prevent clogging, a conveyer, flights on the conveyer dipping into the liquid to pick up the floatable solid products, and paddle means to move the solid products into the path of the conveyer flights.

3. A discharge mechanism for floatable waste solid products comprising a chute, a pool of liquid into which the chute discharges, a conveyer, flights on the conveyer dipping into the liquid to pick up the floatable solid products, means to agitate the liquid adjacent the discharge end of the chute to prevent clogging, and paddle means to move the floatable solid products into the path of the conveyer flights.

4. A discharge mechanism for floatable waste solid products from a process carried on out of communication with the atmosphere, comprising a chute having a lower end down which the floatable solid products are adapted to pass, a liquid pool into which the lower end of the chute passes to form a liquid seal for that lower end, blade means located exteriorly of the chute to agitate the liquid adjacent to the lower end of the chute to prevent clogging, a paddle device to give the products movement in a given direction, and a conveyer member with the liquid adapted to receive the products and discharge them.

5. A discharge mechanism for floatable waste solid products from a process carried on out of communication with the atmosphere, comprising a chute having a lower end down which the floatable solid products are adapted to pass, a liquid pool into which the lower end of the chute passes to form a liquid seal for that lower end, a paddle device to give the products movement in a given direction, a conveyer member with the liquid adapted to receive the products and discharge them, and means to create a movement of the liquid adjacent the discharge end of the chute.

6. A discharge mechanism for citrous fruit peels comprising a vat containing water, a discharge chute into which the peels are passed, the lower end of the chute projecting below the water in the vat, means to create movement of the water adjacent said discharge end, a paddle adapted to move the floating peels, a trough in communication with the vat into which the paddle directs the floating peels, and a conveyer moving in the trough to discharge the peels therefrom.

7. A discharge mechanism for floatable waste solid products such as skins of fruits or the like from a process carried on out of communication with the atmosphere wherein juice is extracted from the fruit or the like, comprising a discharge chute having its lower end disposed in a liquid seal, said seal comprising a liquid in a container, agitating means disposed near the lower end of the discharge chute to agitate the liquid therearound, paddle means spaced from said agitating means and adapted to urge the liquid in a designated direction, and a conveyer member passing through the liquid at a point in the path of the direction toward which the paddle means is urging the said liquid, adapted for carrying engagement with the said floatable waste solid products.

RONALD B. McKINNIS.